United States Patent [19]
Pierce

[11] Patent Number: 5,237,556
[45] Date of Patent: Aug. 17, 1993

[54] WIDE BEAM DETECTOR SYSTEM FOR OPTICAL MEMORIES

[75] Inventor: Gerald A. Pierce, Redwood City, Calif.

[73] Assignee: Samsung Electronics Co., Ltd., Swon City, Rep. of Korea

[21] Appl. No.: 812,947

[22] Filed: Dec. 24, 1991

[51] Int. Cl.$^5$ .................... G11B 7/007; G11B 3/78
[52] U.S. Cl. .................... 369/97; 369/44.13; 369/44.23; 369/44.42; 369/112; 369/119
[58] Field of Search ............ 369/44.13, 44.23, 44.42, 369/97, 112, 119

[56] References Cited

U.S. PATENT DOCUMENTS

| | | |
|---|---|---|
| 3,780,266 | 12/1973 | Mudsam et al. |
| 4,321,622 | 3/1982 | Jerome et al. ............ 369/44.13 |
| 4,449,212 | 5/1984 | Reno ............ 369/44.13 |
| 4,466,087 | 8/1984 | Cheng . |
| 4,767,921 | 8/1988 | Kawasaki et al. ............ 369/44.23 |
| 4,931,628 | 6/1990 | Wada ............ 369/119 |
| 5,081,617 | 1/1992 | Gelbart ............ 369/112 |

OTHER PUBLICATIONS

T. Ishida et al., "High Speed Optical Card Reader/Writer Using Two Optical Sources", 1989, pp. 4-265.

*Primary Examiner*—Roy N. Envall, Jr.
*Assistant Examiner*—Jennifer L. Hazard
*Attorney, Agent, or Firm*—Burns, Doane, Swecker & Mathis

[57] ABSTRACT

The present invention relates to a method and apparatus for high speed reading of multiple data tracks stored on an optical recording medium, such as a flexible optical tape. Data can be accurately read in the presence of position and alignment errors illuminating plural tracks of the optical recorded medium with an expanded light beam.

24 Claims, 4 Drawing Sheets

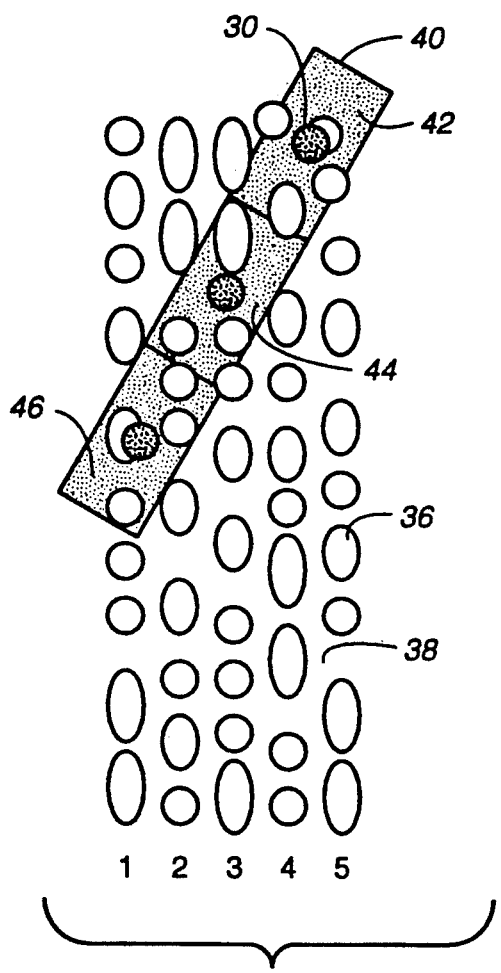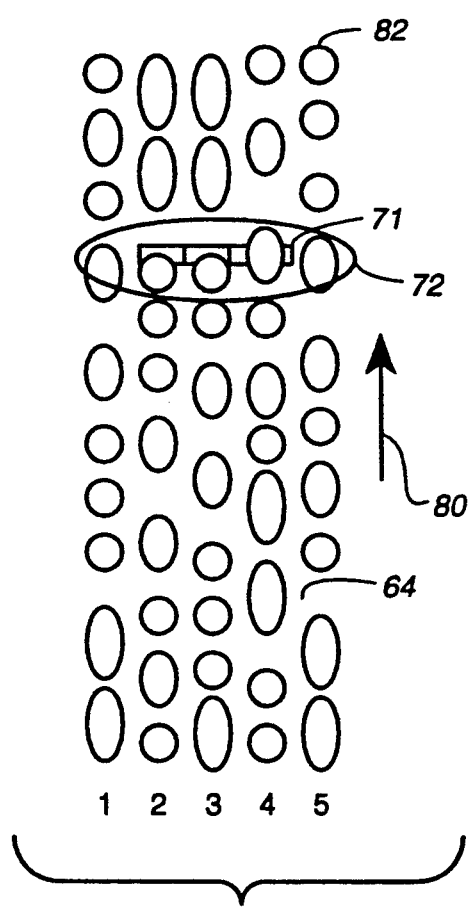
FIG._1
(PRIOR ART)
FIG._3

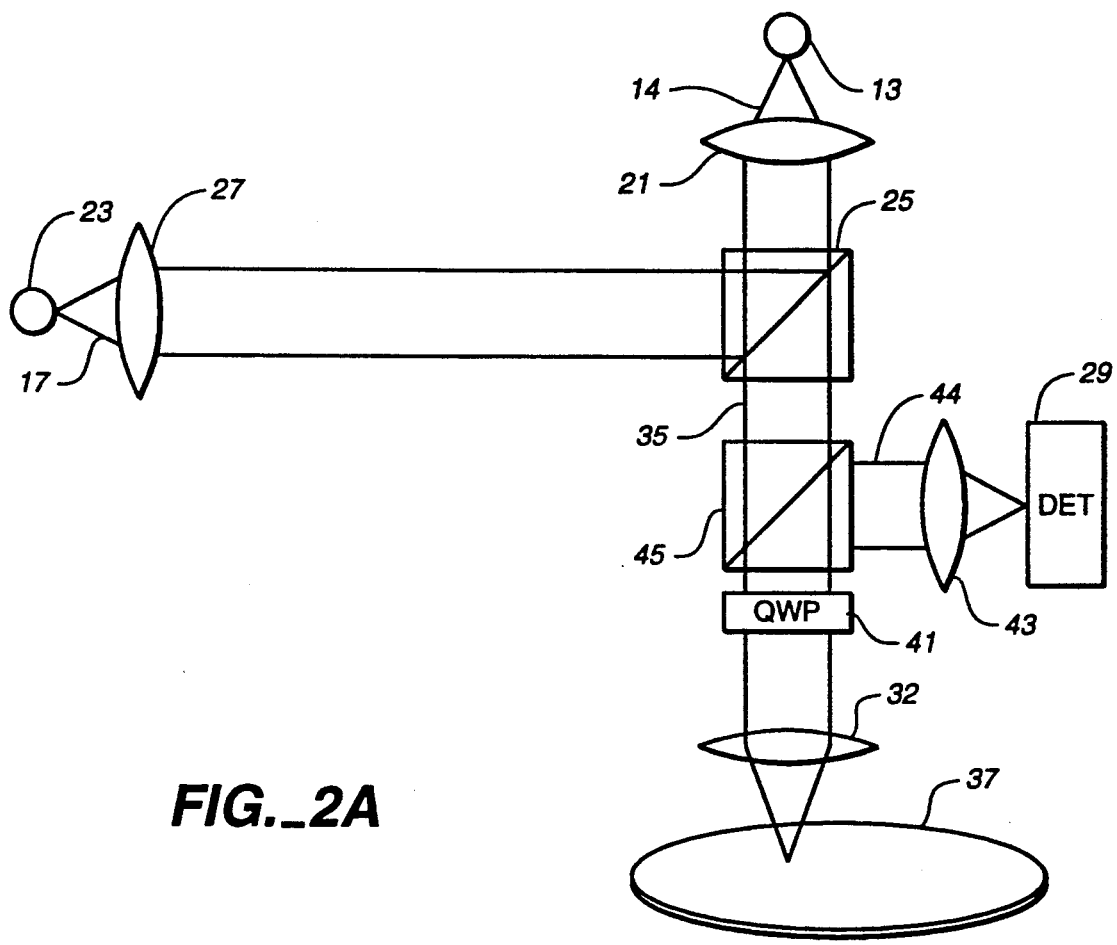
FIG._2A
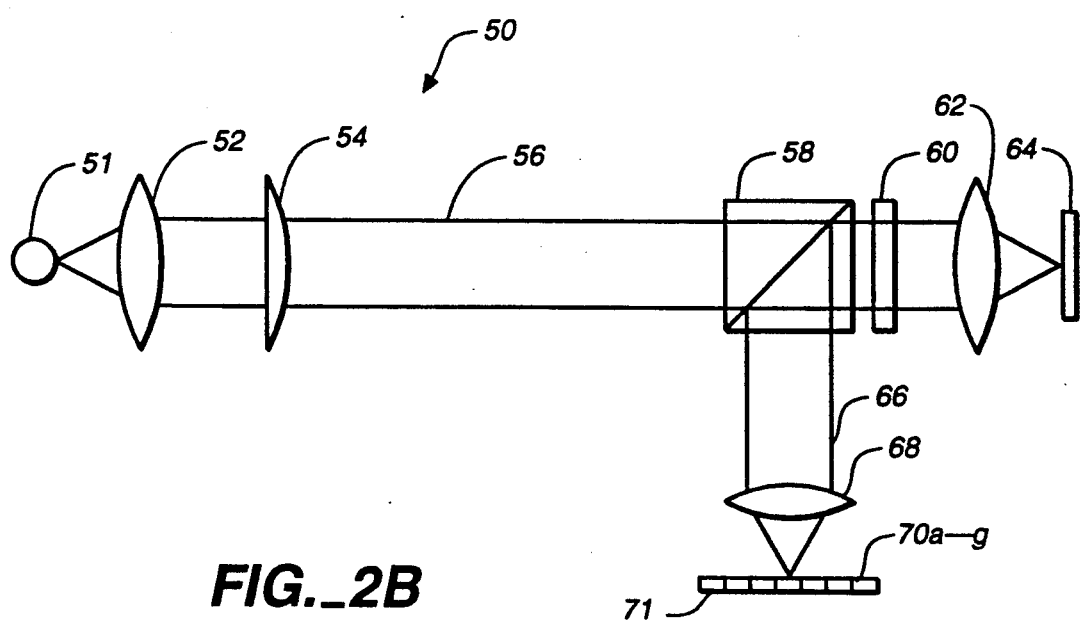
FIG._2B

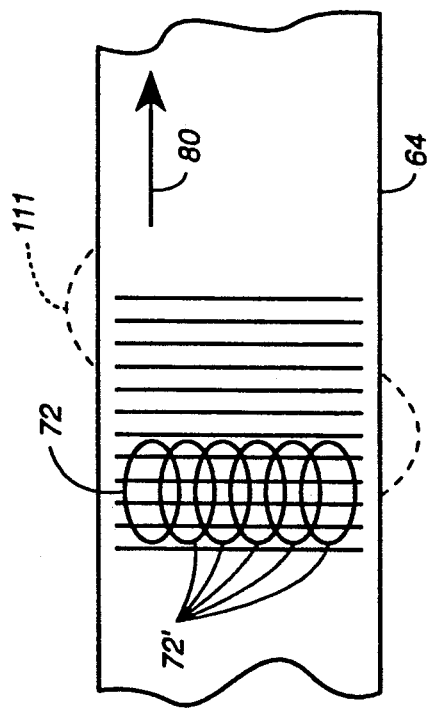
FIG._4
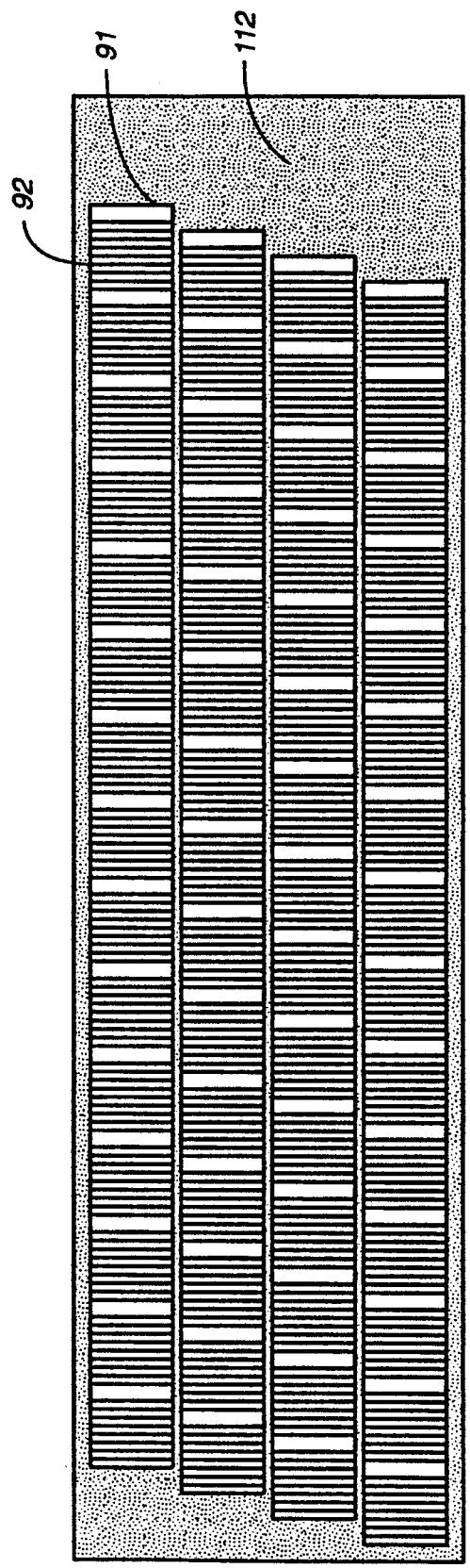
FIG._6

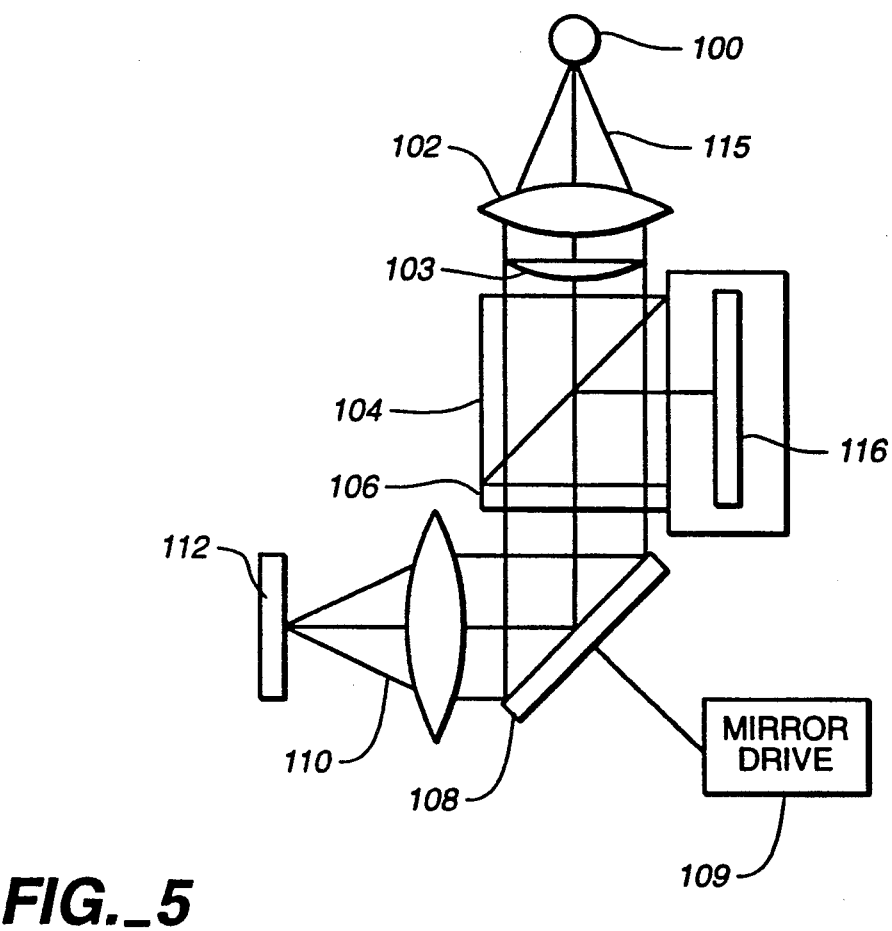
FIG._5

WIDE BEAM DETECTOR SYSTEM FOR OPTICAL MEMORIES

BACKGROUND OF THE INVENTION

1. Field of the Invention

The present invention relates generally to analog/digital recording and playback systems. More particularly, the invention relates to optical systems for retrieving data from a storage medium such as an optical tape.

2. State of the Art

Known optical memory systems record information by directing a scanning beam of laser light to produce spots representing bits of data on a moving storage medium, such as a flexible optical tape. For example, FIG. 1 shows five parallel tracks of data spots 36 recorded on a moving optical tape 38. The data spots 36 have a reflectivity, transmissivity or other optical characteristic that can be distinguished from the background of the optical tape 38.

Typically, optical reading systems use a narrow beam that reads a single track of data spots. For example, in the FIG. 1 embodiment, a detector 40 reads data stored on the optical tape 38 and includes three segmented photodetectors 42, 44 and 46 for detecting reflected light. The photodetectors 42, 44 and 46 are used in connection with a three beam light source and are arranged to receive light reflected from selected tracks numbered 1, 3 and 5 respectively.

The three beam light source reads a single track of stored data by illuminating the optical tape with three relatively narrow, focused beams 30. Each of the narrow beams 30 is associated with a given one of the photodetectors 42, 44 or 46, respectively. The detector 44 is typically used for data read-out while the detectors 42 and 46 are used for tracking.

As referenced herein, the term "narrow" refers to a light beam which illuminates an area on a recording medium that does not exceed the width of one recorded track of data spots. Because narrow beams 30 are used to read data, each of the photodetectors 42, 44 and 46 has a relatively wide area for detecting reflections from the optical tape.

The limited ability of optical systems to simultaneously read more than one track of flexible optical tape is largely due to the use of conventional tracking techniques. For example, FIG. 2a of the present specification corresponds to U.S. Pat. No. 4,730,293 and shows a servo controlled tracking technique for reading and writing a rigid storage medium such as an optical disk or data card.

For a rigid optical disk having a fixed center of rotation, data stored on the disk is recorded in a single line which continues around the disk. Using mechanical servo control techniques, the information is typically recorded in data tracks which rotate at an approximate speed of 20-30 Hz. A mechanical arm supporting the laser head is servo controlled to accurately align the laser beam with the data tracks.

Referring to FIG. 2a, spots representing bits of data can be written onto a rigid disk 37 by directing a laser light beam 14 from a laser light source 13 toward the disk through a collimating lens 21, a beam splitter 25, and a quarter wave plate 41. The light beam is focused on the disk through a final optical lens 32.

Data is retrieved (i.e., read) from the disk by scanning a beam 17 from a lower intensity laser light source 23 onto the disk. The light beam 17 is directed toward the disk through a lens 27, the beam splitter 25 and the lens 32. The light beam 17 is deflected, scattered or transmitted by the previously recorded spots to one or more photodetectors.

As described at column 3, line 52 of the aforementioned patent, lens 32 may be centered with respect to an optical axis 35. In this case, light deflected by the disk is directed along an optical path 44 to a detector 29 by lens 32, quarter wave plate 41, a beam splitter 45, and a lens 43. U.S. Pat. No. 4,730,293 further discloses the use of a differential output from two detectors (e.g., detectors 104 and 106 in FIG. 6 of the patent) as a servo control signal for mechanically aligning the laser light source with a recorded data track.

Although conventional tracking systems as described above are relatively accurate when reading data from a rigid storage medium, these same systems are extremely susceptible to alignment errors when reading data from a flexible storage medium. For example, the side to side movement of a flexible optical tape presents increased potential for misalignment between the light source, the moving optical tape and the detector. This misalignment can cause inaccurate tracking and reading of the recorded data, especially where a scanning light source is used. Further inaccuracies due to tracking can significantly increase when the data is not accurately recorded on the optical tape.

Where difficulties in tracking arise, additional error checking and correcting measures are typically proposed. However, error checking often involves reading recorded data more than once, thereby reducing the overall system speed. Where multiple laser beams are used for tracking, further reductions in reading speed may be necessitated due to the increased potential for misalignment between the laser heads and the plural detectors.

Accordingly, there is a need for a system capable of reading data from an optical storage medium, such as an optical tape, which is free of the aforementioned drawbacks (e.g., misalignment errors) so that high speed data acquisition and performance can be achieved.

SUMMARY OF THE INVENTION

The present invention relates to an apparatus for high speed reading of multiple analog or digital data tracks stored on a flexible optical recording medium in the presence of positioning and alignment errors. In preferred embodiments, the apparatus is an optical system which includes means for illuminating the optical recording medium with a light beam. Means for transmitting light are positioned between the illuminating means and the optical recording medium to illuminate the optical recording medium, said transmitting means further including means for expanding at least one dimension of the light beam. Further, means are provided for reading information from an area of the optical recording medium illuminated by the expanded light beam.

In a preferred embodiment, a laser light beam is passed through a light expanding element to create a wide (e.g., elliptical) beam for illuminating a relatively large area of the optical recording medium. For example, the expanded light beam covers an area which exceeds the width of a single data track recorded on the optical recording medium. Light reflected by the optical recording medium is sensed by a detector array to read the stored data.

The optical system, including the expanded light beam and detectors are preferably deflected by a galvanometer mirror of a galvanometer scanning system. The galvanometer mirror oscillates to scan the light beam along plural data tracks stored on the optical recording medium. In a preferred embodiment, plural data tracks are recorded on a flexible optical tape in a direction transverse to a direction of tape movement. Light reflected from the optical recording medium is then directed by the resonant galvanometer mirror toward a detector array to read the stored data.

BRIEF DESCRIPTION OF THE DRAWINGS

The present invention can be further understood from the following detailed description of the preferred embodiments as described in conjunction with the accompanying drawings, wherein like elements are designated with like numerals and wherein:

FIG. 1 shows a conventional three-beam detector;

FIG. 2a shows a conventional optical tracking system for a rigid medium as described above;

FIG. 2b shows an exemplary preferred embodiment of the present invention;

FIG. 3 shows an optical image and exemplary data format created on an optical medium in accordance with the exemplary FIG. 2b embodiment;

FIG. 4 shows a more preferred optical scanning technique and data format using the exemplary FIG. 5 detector to read/write parallel tracks of data transverse to a direction of optical tape movement;

FIG. 5 shows another exemplary embodiment of the present invention, including a galvanometer scanning system; and FIG. 6 shows an exemplary optical tape format for use with the present invention.

DETAILED DESCRIPTION OF THE PREFERRED EMBODIMENTS

FIG. 2b illustrates an exemplary embodiment of an apparatus for reading analog or digital data from an optical recording medium using a wide beam optical detection system. In a preferred embodiment, the optical recording medium is an elongated, flexible optical tape 64 which can be used in a data, audio, and/or video tape recorder (i.e., VCR). Information is stored on the optical tape 64 as data spots. The stored information includes data for tracking side-to-side movement of the optical tape. It will be apparent to those skilled in the art that the present invention is equally applicable to the reading of data from any optical recording medium, including optical data cards and disks.

In the exemplary FIG. 2b embodiment, the means for illuminating the optical tape includes a light source, such as a semiconductor laser 51. However, it will be apparent to those skilled in the art that other light sources can be used in place of the laser 51. For example, an LED light source can also be used.

Light from the laser 51 is transmitted toward the optical tape 64. In a preferred exemplary embodiment, the transmitting means includes a collimating lens 52, a polarizing beam splitter 58, a quarter wave plate 60 and a focusing lens 62. As shown in the FIG. 2b embodiment, a means for expanding the light includes a cylindrical lens 54 as part of the transmitting means.

The collimating lens 52 transforms the light from laser 51 into a nearly parallel beam that does not appreciably converge or diverge. The light beam is transmitted through the cylindrical lens 54 and thereby expanded into a wide light beam 56. In a preferred embodiment, the light beam is expanded in one dimension by the cylindrical lens 54 into an elliptical shape.

The wide beam 56 illuminates a relatively large area on the optical tape 64. As referenced herein, the term "relatively large" refers to an area on an optical recording medium which encompasses more than one track of stored information. The wide light beam 56 is subsequently transmitted through the polarizing beam splitter 58, the quarter wave plate 60 and the focusing lens 62. The focusing lens 62 focuses the wide light beam 56 onto the optical tape 64.

FIG. 3 illustrates an optical tape having information recorded thereon in parallel data tracks labelled 1 through 5. Each of these data tracks is formed as a row of optically recorded data spots 82. These data spots possess a different reflectivity than that of the surrounding background. In the exemplary FIG. 3 data format embodiment, the tracks are formed parallel to a direction of recorded movement represented by the arrow 80. This may be the tape direction for a simple low speed system.

However, in a more preferred embodiment, the parallel tracks are formed across the width of a flexible optical tape transverse to the direction of tape movement as shown in FIG. 4. When a data format such as that of FIG. 4 is used, plural wide light beams 72 can be placed over the width of the tape as represented by the light beams 72' in FIG. 4. However, in a preferred embodiment, a scanning beam is used to read and write data as will be described with respect to FIG. 5.

As shown in FIGS. 3 and 4, the wide light beam 72 illuminates an area of the optical tape 64 which encompasses plural tracks of recorded information. To read the parallel tracks of recorded information, the wide light beam 72 is directed toward the optical tape as the optical tape is moved in the direction 80. Because plural tracks are simultaneously illuminated, the data spots recorded in each of these tracks can be simultaneously detected as they pass beneath the wide light beam 72.

In the FIG. 2b embodiment, data stored on the optical tape 64 is read by detecting light reflected from the data spots. The reflected light is transmitted by the focusing lens 62 and the quarter wave plate 60 toward the polarizing beam splitter 58 as shown in FIG. 2b. A light beam 66 is reflected by the polarizing beam splitter toward a reading means. In the exemplary FIG. 2b embodiment, the reading means includes a lens 68 which focuses the light beam 66 onto a detector array 71.

Although the detector array 71 is shown to include seven light detector elements (e.g., PIN photodiodes) labelled 70a-g, it will be apparent to those skilled in the art that any number of discrete detector elements can be used. However, in preferred embodiments, the detector array must be wide enough to match the tolerance of lateral optical tape movement and the illumination spread of the illumination system. That is, the detector array must be able to detect light reflected from the tracks of the optical tape 64 over the entire range of expected side to side optical misalignments (i.e., in a direction perpendicular to the arrow 80 in FIG. 3 and 4).

When light reflected from the optical tape 64 strikes one or more of the light detecting elements, the light detecting elements produce electrical signals. These electrical signals are evaluated to identify the presence of data spots on the optical tape. As previously mentioned, these data spots are representative of analog or digital information, including tracking and focusing information.

In the exemplary FIG. 2b embodiment, positions of the reading means and the illuminating means remain fixed, with scanning of the optical tape being effected solely by movement of the tape beneath the illuminated area. Because the optical medium 64 will move laterally as the tape passes under the illuminated area, the data tracks stored on the tape will also waiver laterally. These variations in the data path must be compensated to accurately read the stored information.

In the exemplary FIG. 2b embodiment, the data from one or more tracks is monitored by the stationary detector array 71. For example, the track labelled 3 in FIG. 3 may be monitored initially by detector element 70g. Detector element 70g will continue to monitor track 3 as long as the light from track 3 is transmitted to detector 70g.

However, as tape 64 shifts laterally, the reflected light from track 3 may shift to the detector element 70f. Detector element 70f will then continue to read track 3 as long as the light reflected from track 3 is transmitted to the detector 70f. Thus, track 3 may be read by a variety of detector elements as the tape is moved along the direction indicated by arrow 80.

In an exemplary embodiment, the detector element (or elements) used to read a particular track is monitored in response to tracking data stored on the optical tape. For example, one of the data tracks in FIG. 3 or FIG. 4 can be recorded with a continuous row of data spots for tracking lateral variations of the optical tape in a manner similar to that described in U.S. Pat. No. 4,730,293, the disclosure of which is hereby incorporated by reference in its entirety.

More particularly, the differential output of two detector elements assigned to read a continuous row of data spots can be used to determine lateral shifts of the moving optical tape. The amount of the detected shift can then be used to monitor which detector element is currently reading which track of data (e.g., monitor a shift from detector element 70b to detector element 70a when a tape shift to the right occurs).

Thus, by monitoring lateral shifting of the optical tape, the electrical signals produced by the detector array 71 can be properly correlated with the recorded data tracks. Since there is no mechanical movement of the illuminating means or the reading means in the exemplary FIG. 2b embodiment, high speed tracking and data acquisition can be realized.

As described above, the FIG. 2b embodiment includes a stationary illuminating means and reading means. Scanning of tracks written on the tape is performed solely by movement of the tape. However, FIG. 5 illustrates a more preferred embodiment which uses a wide light beam that is scanned cross-wise relative to tape movement for reading data stored on the optical recording medium.

In the preferred FIG. 5 embodiment, a means for illuminating an optical tape 112 includes a solid state semiconductor laser 100. Means for transmitting light from the laser 100 to the optical tape includes a collimating lens 102, a light expanding means 103, a polarizing beam splitter 104, a quarter wave plate 106, a scanning galvanometer mirror 108 (and scanning mirror drive 109) and a focusing lens 110. As shown in the FIG. 5 embodiment, light expanding means includes a cylindrical lens 103.

A means for reading information from the optical tape includes the focusing lens 110, the scanning galvanometer mirror, the polarizing beam splitter 104, and a detector array 116. The detector array 116 includes a series of light detector elements (e.g., PIN photodiodes) which are arranged in a substantially straight line as described with respect to FIG. 2b.

Light from the FIG. 5 solid state semiconductor laser 100 is collected by the collimating lens 102 and focused into a parallel beam 118 which does not appreciably converge or diverge. The light beam 118 is then expanded, preferably in one dimension, by the cylindrical lens 103 to create a wide light beam (e.g., elliptical). The wide light beam from lens 103 is transmitted through the polarizing beam splitter 104 and the quarter wave plate 106 to the scanning galvanometer mirror 108. The light beam 118 is reflected off of the galvanometer mirror 108 to the focusing lens 110 which focuses the light beam onto the optical tape 112. In a preferred embodiment, the wide beam is scanned back and forth across the tape along a substantially sinusoidal path 111.

The optical tape 112 includes plural data tracks of optically recorded information (e.g., audio and/or video data). The information is stored on the optical tape in known fashion, as previously described. In a preferred embodiment, the data tracks are recorded on the optical tape 112 substantially perpendicular to the direction of tape movement as described with respect to FIG. 4.

To read the information stored on the tape, the FIG. 5 light beam 118 is transmitted toward the optical tape 112 and reflected by data spots recorded thereon. Light reflected from the data spots is collected by the focusing lens 110 and directed toward a stationary detector array 116 via the scanning galvanometer mirror 108 and the polarizing beam splitter 104.

The scanning galvanometer mirror is oscillated at a predetermined frequency in a direction transverse relative to tape movement. Light directed toward the flexible tape is thereby scanned back and forth across the tape. Similarly, light reflected by data spots stored across the tape (i.e., in tracks perpendicular relative to tape movement) is directed to the stationary detector via the scanning galvanometer mirror.

The predetermined frequency at which the galvanometer oscillates is selected on the basis of tape speed movement. The galvanometer mirror can be controlled in any well known manner.

In an alternate preferred embodiment, the data format of FIG. 4 can be replaced with a data format as shown in FIG. 6. In FIG. 6, the optical tape 112 includes several bands 91 along its width. Within each of the four bands shown, the data spots are recorded along parallel data tracks arranged perpendicular to the direction of tape movement, represented by the arrow 114.

To allow the system to optically read the bands of data tracks shown in FIG. 6, the optical system is centrally positioned above one of the bands. The galvanometer mirror 108 oscillates at a predetermined frequency (e.g., resonant frequency). This causes the light beam 118 to strike the mirror 108 and to oscillate across the band on tape 112 as described with respect to FIG. 4. The detector array 116 is effectively codeflected so as to always view the illuminated region on the tape. After a given band has been scanned, the FIG. 5 optical system (i.e., light source and detector array) are repositioned over the next band along the width of the tape. Thus, only one band is scanned at a time. In an alternate embodiment, a separate light source and detector can be provided for each band.

It will be appreciated that the present invention can be embodied in other specific forms without departing from the spirit or essential characteristics thereof. The present disclosed embodiments are therefore considered in all respects to be illustrative and not restrictive. The scope of the invention is indicated by the appended claims rather than the foregoing description, and all the changes that come within the meaning and range and equivalents thereof are intended to be embraced therein.

What is claimed is:

1. Apparatus for reading plural tracks of information stored on an optical recording medium comprising:
    means for illuminating said optical recording medium having plural parallel tracks of said information stored thereon;
    means positioned between said illuminating means and said optical recording medium for transmitting light from said illuminating means onto said optical recording medium, said transmitting means further including means for expanding said light in at least one dimension; and
    means for reading said plural tracks of said information from an area of said optical recording medium illuminated by said expanded light, said reading means including at least one detector for reading information from either of at least two of said plural parallel tracks, said plural parallel tracks being arranged substantially perpendicular to a desired direction of movement of said optical recording medium and to said reading means such that said reading means simultaneously reads plural tracks of information.

2. Apparatus as recited in claim 1 wherein said illuminating means includes a laser.

3. Apparatus as recited in claim 1 wherein said illuminating means includes an LED.

4. Apparatus as recited in claim 1 wherein said reading means includes an array of light detectors for receiving light reflected from said illuminated area of said optical recording medium.

5. Apparatus as recited in claim 4 wherein said array of light detectors are arranged along a straight line.

6. Apparatus as recited in claim 1 wherein said optical recording medium is an optical tape having said information arranged thereon as a plurality of parallel data tracks.

7. Apparatus as recited in claim 6 wherein an output of said reading means is further used to correlate information read from said optical recording medium to a track from which said information was received.

8. Apparatus as recited in claim 1 wherein said light expanding means includes a cylindrical lens.

9. Apparatus as recited in claim 1 wherein said reading means electrically tracks said stored information with said array of light detectors.

10. Apparatus for reading plural tracks of information stored on an optical recording medium comprising:
    means for illuminating said optical recording medium having plural tracks of said information stored thereon, said information being arranged as a plurality of parallel data tracks;
    means positioned between said illuminating means and said optical recording medium for transmitting light from said illuminating means onto said optical recording medium, said transmitting means further including means for expanding said light in at least one dimension; and
    means for reading said plural tracks of said information from an area of said optical recording medium illuminated by said expanded light, said reading means including at least one detector for reading information from either of at least two of said plural tracks and including an output which is used to correlate information read from said optical recording medium to a track from which said information was received, said parallel data tracks being arranged substantially perpendicular to a desired direction of optical medium movement and to said reading means, such that said reading means simultaneously reads plural tracks of said information.

11. Apparatus for reading plural tracks of data stored on an optical recording medium comprising:
    means for illuminating said optical recording medium with a light beam;
    means positioned between said illuminating means and said optical recording medium for transmitting light from said illuminating means to said optical recording medium; and
    means for reading information from an area of said optical recording medium illuminated by said light beam, and correlating information detected by said reading means to either of at least two of said plural tracks, said optical recording medium having plural parallel data tracks arranged substantially perpendicular to said direction of optical medium movement and to said reading means such that said reading means simultaneously reads plural tracks of stored data, and said transmitting means further including:
    means for expanding said light beam in at least one dimension; and
    a galvanometer mirror for directing said expanded light beam onto said optical recording medium.

12. Apparatus as recited in claim 11 wherein said illuminating means is a laser.

13. Apparatus as recited in claim 11 wherein said light source is an LED.

14. Apparatus as recited in claim 11 wherein said reading means includes an array of light detectors for receiving said reflected light from said illuminated area of said optical recording medium.

15. Apparatus as recited in claim 14 wherein said array of light detectors are stationarily arranged in a substantially straight line.

16. Apparatus as recited in claim 11 wherein said optical recording medium is an optical tape having said information stored thereon as a plurality of parallel data tracks.

17. Apparatus as recited in claim 16 wherein an output of said reading means is used to correlate information read from said optical recording medium to a track from which said information was received.

18. Apparatus for reading plural bands of parallel tracks of data stored on an optical recording medium comprising:
    means for illuminating said optical recording medium with a light beam;
    means positioned between said illuminating means and said optical recording medium for transmitting light from said illuminating means to said optical recording medium; and
    means for reading information from an area of said optical recording medium illuminated by said light beam, and correlating information detected by said reading means to either of at least two of said tracks, wherein said plural bands are arranged parallel to a direction of optical medium movement and said parallel data tracks are arranged perpendicular to said direction of optical medium movement and to said reading means, said transmitting means further including:

means for expanding said light beam in at least one dimension;

a galvanometer mirror for directing said expanded light beam onto said optical recording medium.

19. Apparatus as recited in claim 18 wherein said galvanometer mirror oscillates to scan said light beam across the parallel data tracks of at least one of said bands.

20. Apparatus as recited in claim 19 wherein said galvanometer is deflected to shift said expanded light beam from one of said bands to another.

21. Apparatus as recited in claim 20 wherein said expanding means is a cylindrical lens.

22. Method for reading plural tracks of data stored on an optical recording medium having plural parallel tracks of information stored thereon comprising the steps of:

generating a light beam for illuminating the optical recording medium;

transmitting light onto said optical recording medium by expanding said light beam to encompass plural tracks of stored information; and reading information from said plural tracks of said optical recording medium illuminated by said expanded light, said step of reading further including a step of electronically correlating information read to either of at least two of said plural parallel tracks, said plural parallel tracks being arranged substantially perpendicular to a desired direction of movement of said optical recording medium such that said step of reading further includes a step of simultaneously reading plural tracks of information.

23. Method as recited in claim 22 wherein said step of transmitting further includes a step of scanning said light beam across said optical recording medium in a direction substantially perpendicular to a desired direction of optical recording medium movement.

24. Method as recited in claim 23 wherein said step of transmitting further includes a step of shifting said scanning light beam across said optical recording medium in a direction substantially perpendicular to said desired direction of optical recording medium movement to sequentially read plural bands of stored information, said plural bands being arranged parallel to said direction of optical recording medium movement.

* * * * *